United States Patent
LaMarche et al.

(10) Patent No.: US 10,874,004 B2
(45) Date of Patent: Dec. 22, 2020

(54) METHOD AND APPARATUS FOR A SIGNAL INDICATOR LIGHT

(71) Applicant: JST Performance, LLC, Gilbert, AZ (US)

(72) Inventors: Bradley J. LaMarche, Gilbert, AZ (US); Pete D. Sibitzky, Lakeside, CA (US); Edgar A. Madril, Mesa, AZ (US)

(73) Assignee: JST Performance, LLC, Gilbert, AZ (US)

( * ) Notice: Subject to any disclaimer, the term of this patent is extended or adjusted under 35 U.S.C. 154(b) by 0 days.

(21) Appl. No.: 16/552,970

(22) Filed: Aug. 27, 2019

(65) Prior Publication Data
US 2019/0387594 A1   Dec. 19, 2019

Related U.S. Application Data

(63) Continuation of application No. 15/586,540, filed on May 4, 2017, now Pat. No. 10,448,476.
(Continued)

(51) Int. Cl.
*H05B 33/08* (2020.01)
*B60Q 1/22* (2006.01)
(Continued)

(52) U.S. Cl.
CPC .............. *H05B 45/20* (2020.01); *B60Q 1/22* (2013.01); *B60Q 1/2615* (2013.01);
(Continued)

(58) Field of Classification Search
CPC ... H05B 33/0857; H05B 33/086; F21S 45/47; F21S 43/37; F21S 43/195; F21S 45/50;
(Continued)

(56) References Cited

U.S. PATENT DOCUMENTS 4,127,844 A ‡ 11/1978 Purdy .................... B60Q 1/44
340/47
4,616,909 A ‡ 10/1986 Dane .................... G02B 7/183
359/85

(Continued)

FOREIGN PATENT DOCUMENTS

WO   WO 2012070799   ‡   5/2012

OTHER PUBLICATIONS http://www.commanderforums.org/forums/commander-general-discussion/ 3711-reverse-lights-install.html.‡

(Continued)

*Primary Examiner* — Tracie Y Green
(74) *Attorney, Agent, or Firm* — Calfee, Halter & Griswold LLP

(57) ABSTRACT

A lighting module is shown and described having a housing with an opening therethrough. A forward portion of the opening may be enclosed by a cap and a rearward portion of the opening may be enclosed by a transparent media. A second media may extend from the opening through a wall of the housing. The cap may be securable to a bar via a mounting apparatus. A PCBA with one or more operational groups of LEDs may be secured within the opening, such that light may be emitted through the media. A second PCBA with one or more operational groups of LEDs may be secured within the opening, such that light may be emitted through the second media. Each operational group may be integrated with a control system of a vehicle, and may be operated individually or collectively. Each operational group may correspond to similar or different colors of light.

20 Claims, 7 Drawing Sheets

Related U.S. Application Data

(60) Provisional application No. 62/339,502, filed on May 20, 2016, provisional application No. 62/370,983, filed on Aug. 4, 2016, provisional application No. 62/339,837, filed on May 21, 2016.

(51) Int. Cl.
| | | |
|---|---|---|
| *B60Q 1/26* | (2006.01) | |
| *B60Q 1/30* | (2006.01) | |
| *B60Q 1/44* | (2006.01) | |
| *H05B 45/20* | (2020.01) | |
| *F21S 43/14* | (2018.01) | |
| *F21S 45/47* | (2018.01) | |
| *F21S 43/37* | (2018.01) | |
| *F21S 43/19* | (2018.01) | |
| *F21S 45/50* | (2018.01) | |
| *F21Y 115/10* | (2016.01) | |

(52) U.S. Cl.
CPC ............ *B60Q 1/2696* (2013.01); *B60Q 1/30* (2013.01); *B60Q 1/44* (2013.01); *F21S 43/14* (2018.01); *F21S 43/195* (2018.01); *F21S 43/37* (2018.01); *F21S 45/47* (2018.01); *F21S 45/50* (2018.01); *F21Y 2115/10* (2016.08)

(58) Field of Classification Search
CPC ......... F21S 43/14; B60Q 1/22; B60Q 1/2696; B60Q 1/44; B60Q 1/30; B60Q 1/2615; F21Y 2115/10
See application file for complete search history.

(56) References Cited

U.S. PATENT DOCUMENTS

| | | | | |
|---|---|---|---|---|
| 4,756,301 A ‡ | 7/1988 | Dane | ............... | F24S 30/452 |
| | | | | 126/69 |
| 5,510,763 A ‡ | 4/1996 | Deckard | ............... | B60Q 1/22 |
| | | | | 340/43 |
| 5,677,603 A * | 10/1997 | Speirs | ............... | F21S 10/007 |
| | | | | 315/324 |
| 5,860,728 A ‡ | 1/1999 | Maglica | ............... | B62J 6/00 |
| | | | | 362/191 |
| 5,923,124 A ‡ | 7/1999 | Paech | ............... | B60Q 1/46 |
| | | | | 315/80 |
| 6,064,302 A ‡ | 5/2000 | Peterson | ............... | B60Q 1/20 |
| | | | | 340/46 |
| 6,641,284 B2 ‡ | 11/2003 | Stopa | ............... | B64D 47/02 |
| | | | | 362/24 |
| 7,002,460 B2 ‡ | 2/2006 | Bolander | ............... | B60Q 1/22 |
| | | | | 340/46 |
| 7,008,079 B2 ‡ | 3/2006 | Smith | ............... | F21V 7/0083 |
| | | | | 362/23 |
| 7,137,674 B2 ‡ | 11/2006 | Goebels | ............... | B60Q 1/22 |
| | | | | 303/19 |
| 7,347,596 B2 ‡ | 3/2008 | Ishikawa | ............... | B62J 6/00 |
| | | | | 362/396 |
| 7,498,686 B2 ‡ | 3/2009 | Capenos | ............... | B60Q 1/0088 |
| | | | | 307/10 |
| 7,513,322 B2 ‡ | 4/2009 | Straka | ............... | A01D 34/828 |
| | | | | 180/53 |
| 7,959,322 B2 ‡ | 6/2011 | Smith | ............... | B60Q 1/2611 |
| | | | | 362/23 |
| 8,545,072 B2 ‡ | 10/2013 | Rice | ............... | G02B 19/0023 |
| | | | | 362/51 |
| 8,967,840 B1 ‡ | 3/2015 | Haney | ............... | B60Q 1/326 |
| | | | | 340/47 |
| 9,145,085 B2 ‡ | 9/2015 | Henry | ............... | B60Q 1/46 |
| 2005/0274098 A1 ‡ | 12/2005 | Weber | ............... | A01D 34/82 |
| | | | | 56/10 |
| 2011/0141754 A1 * | 6/2011 | Hikmet | ............... | F21S 41/645 |
| | | | | 362/464 |
| 2013/0004153 A1 ‡ | 1/2013 | McKee | ............... | F16M 11/041 |
| | | | | 396/420 |
| 2016/0097493 A1 * | 4/2016 | Anderson | ............... | G03B 15/03 |
| | | | | 362/8 |
| 2016/0100084 A1 ‡ | 4/2016 | Schofield | ............... | B60C 23/00 |
| | | | | 348/148 |

OTHER PUBLICATIONS

International Search Report and Written Opinion of the International Search Authority for copending International Patent Application No. PCT/US17/31074, dated Sep. 15, 2017, 12 pgs.‡
https://www.ribstore.com/store/?model_number=RLB291A.‡
http://www.f1 50forum.com/f38/reverse-light-wiring-override-274188/.‡
http://www.atvobsession.com/board/viewtopic.phpt=52.‡
http://www.polarisatvforums.com/forums/polaris-sportsman/1 896-new-reverse-override-reverse-light-od-no-switches-working-scroll-feature.html.‡
International Search Report and Written Opinion of the International Search Authority for copending International Patent Application No. PCT/US17/31 074, dated Sep. 15, 2017, 10 pgs.‡
http://www.f150forum.com/f38/reverse-light-wiring-override-274188/, F150Forum.com, Reverse light wiring override?, 19 pgs, Sep. 24, 2014.‡

* cited by examiner
‡ imported from a related application

US 10,874,004 B2

METHOD AND APPARATUS FOR A SIGNAL INDICATOR LIGHT

FIELD OF THE INVENTION

The present invention generally relates to lighting systems, and more particularly to lighting systems distributing light in a rearward direction from a vehicle that is indicative of automatically and/or manually generated signaling.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

For example, the off-road vehicle market has seen a broad shift toward the use of LEDs in lighting systems due to poor visibility during off-road operation of the off-road vehicle that may be caused by any number of environmental, vehicular, or other conditions. For example, heavy wind, rain, snow, sleet, or other precipitation or particulates in the air may reduce visibility. Further, the off-road vehicle may have limited mounting locations for lighting systems, thereby limiting the vehicle's light output. Further, an operator may have to make compromises between which lighting modules to mount within the system due to limited space, which may limit his ability to signal vehicle operations to other vehicles in the area.

In general, lighting systems are mounted to an off-road vehicle by a mounting apparatus. Further, lighting systems become increasingly heavier with the addition of more and more lighting modules. Thus, the larger the system, the greater the strain on the mounting apparatus. For example, lighting systems may frequently shift, rotate, or break off of the off-road vehicle due to failure of the mounting apparatus during operation of the off-road vehicle on uneven terrain.

Efforts continue, therefore, to develop lighting systems which maximize light output, minimize weight and use of mounting space, and enable all required and optional signaling options to be performed.

SUMMARY

To overcome limitations in the prior art, and to overcome other limitations that will become apparent upon reading and understanding the present specification, various embodiments of the present invention disclose a method and apparatus for a lighting device that is responsive to both manual signaling and automatic signaling.

In accordance with one embodiment or the invention, a lighting module, coupled to a vehicle control system, comprises a housing with a first opening therein, a first operational group of light sources arranged within the opening and configured to emit light in response to a first vehicle operating condition, a second operational group of light sources arranged within the opening and configured to emit light in response to a second vehicle operating condition, and a third operational group of light sources arranged within the opening and configured to emit light independently of any vehicle operating condition.

In accordance with another embodiment of the invention, a lighting system, electrically coupled to a vehicle control system, comprises one or more lighting modules, each of the lighting modules including, a housing, one or more operational groups of light sources, and a controller, wherein the controller of each of the one or more lighting modules communicate with each other in at least one mode of operation of the lighting system.

In accordance with another embodiment of the invention, a mounting apparatus, coupled to a fixture, comprises a mounting bracket including a first surface and a second surface positioned at an angle from the first surface, and a mounting arm capable of extending around a structural element, the mounting arm including opposing ends configured to be coupled to the first and second surfaces, respectively, wherein opposing ends of the mounting arm are moveable with respect to the first and second surfaces to secure the structural element.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
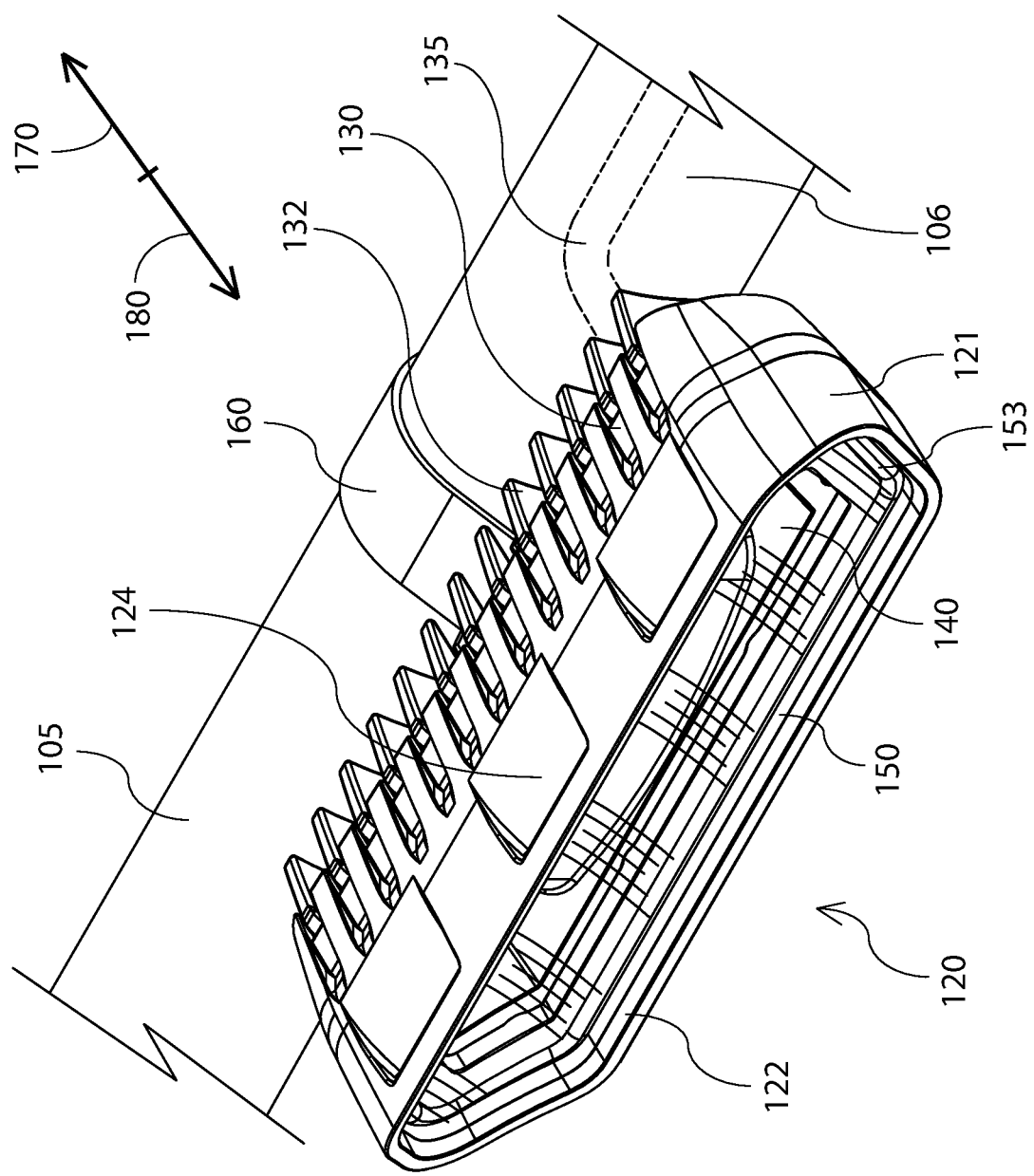
FIG. 1 illustrates an isometric view of a lighting module mounted on a bar of a vehicle according to an embodiment of the present invention.

Generally, the various embodiments of the present invention are applied to a rearward facing lighting apparatus and a method for distributing light in a rearward direction from a vehicle. More particularly, the apparatus may include a lighting system integrated with and operable by a control system in a vehicle (e.g., an existing control system within the vehicle that facilitates various signaling operations of the vehicle, such as signaling indicative of braking, turning and reverse motion). An operator of the vehicle may operate the lighting system independently and/or via the existing control system of the vehicle. The lighting system may include at least one lighting module, but may include more lighting modules as desired. A single lighting module may provide the vehicle operator with a defined set of signaling options, therefor, the addition of one or more additional lighting modules may increase the signaling options available to the vehicle operator.

The lighting module may include a housing with an opening therethrough for containing the various components of the lighting module. For example, the opening may contain a printed circuit board assembly (PCBA) that may provide electronics, or control circuitry, to regulate power provided to one or more light sources electrically connected to the PCBA. For example, the light sources may be light emitting diodes (LEDs) provided on the PCBA, which may include laser diodes provided on the PCBA. A person of ordinary skill in the art will appreciate the utility of various types of light sources in the present invention.

A reflector may be located within the opening to redistribute light emitted by the one or more LEDs. The opening may be sealed by a cap at a forward end thereof, and by a media at a rearward end thereof. One or more gaskets may be used to create a seal between the cap and the housing and/or between the media and the housing. The PCBA may be secured to the cap at the forward end of the opening, such that the LEDs may emit light rearwardly through the media.

A mounting apparatus may be secured to an exterior of the cap to enable the lighting module to be secured to a structural element of the vehicle (e.g., a roll bar). The mounting apparatus may be capable of accommodating structural elements of different sizes, shapes, and/or dimensions.

Signaling options may be provided by grouping the one or more LEDs of the lighting module into one or more operational groups. For example, the lighting module may have one operational group of LEDs. In another example, the lighting module may have two operational groups of LEDs. In another example, the lighting modules may have three or more operational groups of LEDs. Each operational group may be operable independently, interdependently, and/or collectively at one or more power levels, and in one or more modes of operation. Further, each operational group of LEDs may have a corresponding color capability. Thus, an operator may select an operational mode corresponding to operation of a specific operational group or groups of LEDs, at a specific power level, and of a particular color.

The operator may select operational modes during normal operation of the vehicle. For example, ignition of the vehicle may cause the activation of one or more operational groups corresponding to running lights of the vehicle. In another example, application of the braking system of the vehicle may cause the activation of one or more operational groups corresponding to brake lights. In another example, engagement of the vehicle into a reverse condition of the transmission may cause the activation of one or more operational groups corresponding to reverse lights. In another example, engagement of a turn signal of the vehicle may cause the activation of one or more operational groups corresponding to turning signals. In another example, engagement of a hazard button of the vehicle may cause the activation of one or more operational groups corresponding to a hazard signal (e.g., strobing). In another example, the operator may desire to see within the interior of the vehicle, or may desire to see immediately around the exterior of the vehicle, and may activate one or more operational groups corresponding to scene lighting (e.g., cabin lights, or courtesy lights).

While one lighting module may have any one or more of the above described features and/or functions, the addition of one or more lighting modules with similar or different operational capabilities and/or colors may enable the operator to increase signaling options, increase light output, diversify visual effect, and/or any combination thereof.

FIG. 1 illustrates an isometric view of a lighting module 120 mounted on a bar of a vehicle (e.g., bar 105 of an off-road vehicle, not shown). For example, bar 105 may be a bar of a roll cage of the off-road vehicle. In another example, bar 105 may be a bar of a bumper of the off-road vehicle. In general, a forward direction is indicated by arrow 170 and a rearward direction is indicated by arrow 180.

While the present embodiment may be described as a rearward facing lighting module or a lighting module emitting light in rearward direction 180, a person of ordinary skill in the art will appreciate that the present invention may be oriented to emit light in any direction.

Lighting module 120 may include a housing 121 with an opening 122 extending therethrough for containing components of the lighting module 120. For example, opening 122 may extend entirely through housing 121, or may extend some distance less than entirely through housing 121. For example, opening 122 may extend from the forward end of housing 121 to the rearward end of housing 121. Housing 121 may be formed of metal (e.g., aluminum), plastic (e.g., Lexan resin), composite material (e.g., glass-filled nylon), and/or any combination thereof. For example, the material of housing 121 may be selected to optimize performance characteristics such as strength, environmental resistance, and/or to minimize weight.

Housing 121 may have one or more scoops 124 extending through a sidewall of housing 121 to induce air flow across lighting module 120, and/or reduce drag at a rearward portion of lighting module 120. For example, housing 121 may include three scoops 124. In another example, housing 121 may include less than three scoops. In another example, housing 121 may include more than three scoops.

A forward portion of opening 122 may be enclosed by a forward covering (e.g., cap 130) to seal the forward portion of opening 122 and prevent entrance of moisture and/or other contaminants. A PCBA (e.g., PCBA 235 of FIG. 2) may be secured within opening 122, and may include one or more LEDs (e.g., LEDs 270-284 of FIG. 2) and associated control circuitry. Cap 130 may include one or more fins 132 for conducting and dissipating heat away from the PCBA and/or the one or more LEDs. A reflector 140 may be placed within opening 122 for redistributing light from the one or more LEDs.

A rearward portion of opening 122 may be enclosed by a rearward covering (e.g., media 150) to seal the rearward portion of opening 122 and prevent entrance of moisture and/or other contaminants. For example, a gasket 153 may be used to create a seal between media 150 and housing 121. Media 150 may be transparent, translucent, opaque, or any combination thereof (e.g., having transparent and translucent regions). Media 150 may have a rearward surface (e.g., an exterior surface) that is flat, or curved as exemplified in FIG. 1. For example, the rearward surface may be concave.

A mounting apparatus 160 may enable lighting module 120 to be secured to bar 105. Mounting apparatus 160 may be any one or more of a band, a belt, a brace, a bracket, a buttress, a chock, a clamp, a clasp, a strap, and a support. For example, mounting apparatus 160 may include a strap extending entirely around bar 105.

The PCBA and/or one or more LEDs may receive power from a cable 135 extending into opening 122. For example, cable 135 may be electrically connected to the PCBA. Further, cable 135 may be electrically connected to a control system (e.g., control system 601 of FIG. 6) of the vehicle. For example, cable 135 may extend into a hollow interior 106 of bar 105, and may extend along a portion of a length of bar 105, as illustrated in FIG. 1. Alternatively, cable 135 may extend along an exterior of bar 105 to the vehicle's control system.

Figure 2:
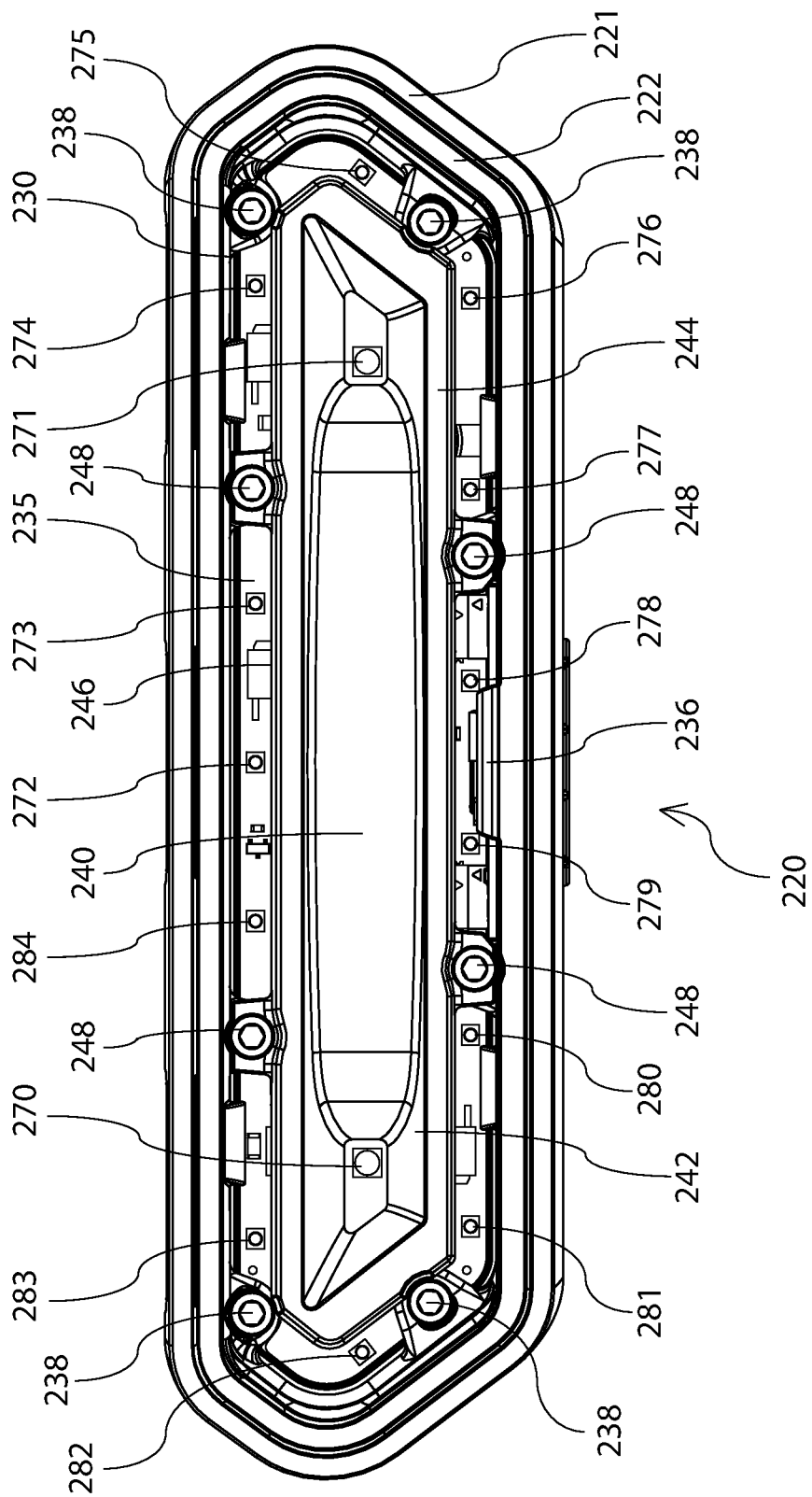
FIG. 2 illustrates interior features of a lighting module according to an embodiment of the present invention.

FIG. 2 illustrates interior features of a lighting module 220. The lighting module 220 may include a housing 221 with an opening 222 extending therethrough for containing components of the lighting module 220. A cap 230 may enclose and/or seal a forward portion of opening 222, and may be secured to housing 221 by one or more bolts, bonds, buckles, catches, clasps, clips, fasteners, hooks, knobs, latches, links, pegs, pins, snaps, or any other connections, or by any combination thereof. For example, cap 230 may be secured to housing 221 with one or more fasteners 238, 248.

A first PCBA 235 may be secured to cap 230 and/or housing 221 within opening 222 and may include circuitry to control and/or regulate power to one or more LEDs (e.g., LEDs 270-284). Further, a second PCBA 236 may be secured to one or more of cap 230, housing 221, and/or PCB 235 within opening 222 and may include circuitry to control and/or regulate power to one or more LEDs (e.g., LEDs 485 of FIG. 4). For example, PCBA 236 may be electrically connected to PCBA 235. PCBAs 235, 236 may individually and/or collectively include circuitry for controlling modes of operation of the LEDs (e.g., LEDs 270-234 of FIG. 2 and LEDs 485 of FIG. 4). PCBA 236 may be oriented substantially perpendicularly to PCBA 235, such that light emitted from the one or more LEDs of PCB 236 (e.g., LEDs 485 of FIG. 4) travels in a direction substantially perpendicular to light emitted from LEDs 270-284 of PCBA 235. In another example, the principal optical axes of light emitted from each LED on PCBA 236 may be substantially perpendicular to the principal optical axes of light emitted from each LED on PCBA 235.

The LEDs associated with PCBA 235 (e.g., LEDs 270-284) and the LEDs associated with PCBA 236 (e.g., LEDs 485 of FIG. 4) may be grouped into one or more operational groups, such that power levels and/or modes of operation of each operational group may be controlled individually, interdependently, and/or collectively. Each operational group may be oriented to emit light outwardly from lighting module 220 in a particular direction or directions and/or in a span of emission. For example, the principal axes of light emission of each LED in one or more operational groups may be oriented such that light is emitted substantially in a single direction (e.g., rearwardly from lighting module 220). In another example, the principal axes of light emission of each LED in one or more operational groups may be oriented such that light is emitted substantially in a plurality of directions (e.g., rearwardly and downwardly from lighting module 220). In another example, at least one operational group of LEDs may emit light rearwardly. In another example, at least one operational group of LEDs may emit light downwardly.

LEDs may be grouped into operational groups to enable lighting module 220 to be used to signal a plurality of vehicle operating conditions (e.g., to be viewable by other nearby vehicles or persons). For example, each operational group may be associated with a signal corresponding to a vehicle operating condition (e.g., a first operational group may be used to signal a reverse driving condition of the vehicle). In another example, a single operational group may be capable of signaling two or more vehicle operating conditions (e.g., a second operational group may be used to indicate driving lights, braking of the vehicle, signaling, or any combination thereof).

LEDs may be grouped into operational groups to produce a particular signaling effect. For example, all the LEDs may be grouped into one operational group. In another example, LEDs 270 and 271 may be grouped into a first operational group, LEDs 272-284 may be grouped into a second operational group, and LEDs corresponding to PCB 236 (e.g., LEDs 485 of FIG. 4) may be grouped into a third operational group. In another example, LEDs 272-284 may be split into separate operational groups (e.g., LEDs 272, 274, 276, 278, 279, 281, and 283 in one group, and LEDs 273, 275, 277, 280, 282, and 284 in another group). A person of ordinary skill in the art will appreciate that a plurality of operational groupings are possible to optimize signaling effects.

LEDs may be grouped into operational groups corresponding to a particular color, and each operational group may have the same or a different color as each other operational group. For example, each operational group may include LEDs emitting any one of white, red, amber, or blue light. In another example, a first operational group may include LEDs emitting white light and a second operational group may include LEDs emitting red light. In another example, a first operational group may include LEDs emitting white light, a second operational group may include LEDs emitting red light, and a third operational group may include LEDs emitting white light. In another example, a first operational group may include LEDs emitting white light, a second operational group may include LEDs emitting amber light, and a third operational group may include LEDs emitting white light. In another example, each operational group of LEDs may be capable of being programmed to produce a wide range of colored light from the visible spectrum (e.g., RGB LEDs). A person of ordinary skill in the art will appreciate that a plurality of color combinations are possible to optimize signal coloring.

LEDs may be grouped into operational groups corresponding to a particular power level, and each operational group may have similar, different, and/or a plurality of different power levels. For example, LEDs in each operational group may receive power at the same power level (e.g., a consistent current and/or voltage). In another example, LEDs in a first operational group may receive power at a first power level, and LEDs in a second operational group may receive power at a second power level. The first power level may be the same as or different than the second power level. In another example, LEDs in the second operational group may receive power at two power levels (e.g., a lower power level and a higher power level). Each power level may correspond to a luminance of light emitted by the one or more LEDs in that operational group. A person of ordinary skill in the art will appreciate that more than two power levels (e.g., 3, 4, 5, 6 or more) may be employed, and further that power levels may be optimized to achieve a desired light output by the LEDs (e.g., as measured in lumens). For example, it may be desirable to maximize light output. In another example, it may be desirable to optimize light output in accordance with industry standards and/or with government regulations (e.g., SAE standards).

A reflector 240 may be placed within opening 222 and may exhibit multiple surfaces (e.g., inner surface 242, rearward surface 244 and outer surface 246) for redistributing light from one or more of LEDs 270-234. Reflector 240 may be secured to housing 221 and/or cap 230 by one or more bolts, bonds, buckles, catches, clasps, clips, fasteners, hooks, knobs, latches, links, pegs, pins, snaps, or any other connections, or by any combination thereof. For example, reflector 240 may be secured to housing 221 and/or cap 230 with one or more bolts 248.

Reflector 240 may have one or more reflective surfaces (e.g., surfaces 242, 244, 246) for optimizing light reflection from the one or more LEDs. For example, reflector 240 may have an inner surface 242, which may reflect light from one or more LEDs and/or light from a first operational group of LEDs (e.g., LEDs 270, 271). In another example, reflector 240 may have a rearward surface 244, which may reflect light originating from outside lighting module 220 (e.g., light emitted from another vehicle, or other ambient light). In another example, reflector 240 may have an outer surface 246, which may reflect light from one or more LEDs and/or light from a second operational group of LEDs (e.g., LEDs 272-284). A person of ordinary skill in the art will appreciate that reflector 240 may reflect light from additional operational groups of LEDs in a similar manner. Each of the reflective surfaces may be flat, curved, parabolic, cylindrical, spherical, concave, and/or convex, as exemplified by parabolic reflector 340 of FIG. 3.

Figure 3:
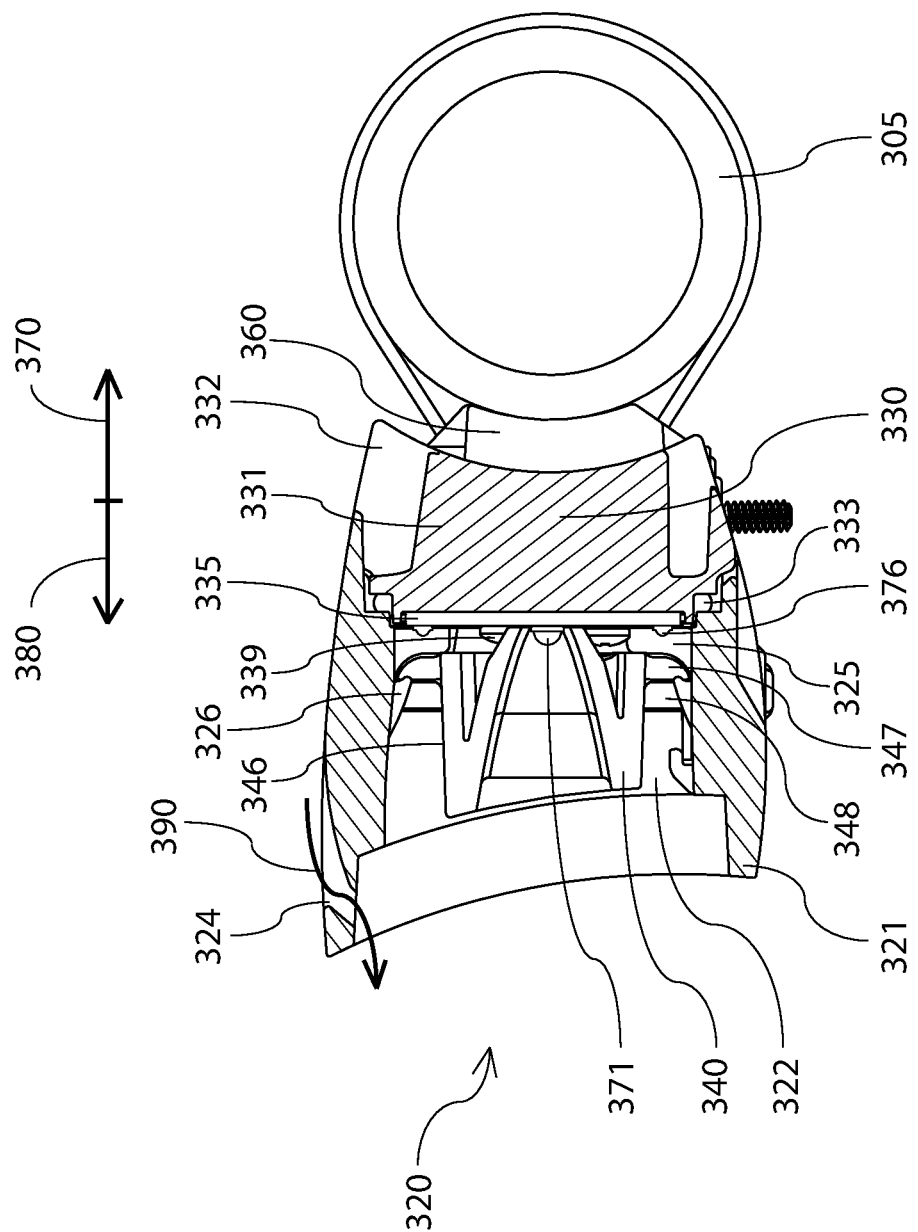
FIG. 3 illustrates a cross-section of the lighting module of FIG. 1.

FIG. 3 illustrates a cross-section of a lighting module 320. In general, a forward direction is indicated by arrow 370, and a rearward direction is indicated by arrow 380. While the present embodiment may be described as a rearward facing lighting module or a lighting module emitting light in rearward direction 380, a person of ordinary skill in the art will appreciate that the present invention may be oriented to emit light in any direction.

Lighting module 320 may be mounted at any point along an outer circumference of a bar 305 (e.g., at a rearward portion of bar 305 as shown). Lighting module 320 may include a housing 321 with an opening 322 extending therethrough for containing components of the lighting module 320. Housing 321 may have one or more scoops 324 extending through a sidewall of housing 321 to induce air flow 390 across lighting module 320, and/or reduce drag at a rearward portion of lighting module 320. For example, air flow 390 may flow across an upper portion of housing 321, may flow through scoop 324, and may exit housing 321 substantially along direction 380.

A forward portion of opening 322 may be enclosed by a forward covering (e.g., cap 330) to seal the forward portion of opening 322 and prevent entrance of moisture and/or other contaminants. For example, a gasket 333 may be used to create a seal between cap 330 and housing 321. Further, cap 330 may be secured to housing 321 with one or more bolts 343. Cap 330 may be formed of metal (e.g., aluminum), plastic (e.g., Lexan resin), composite material (e.g., glass-filled nylon), and/or any combination thereof. For example, the material of cap 330 may be selected to optimize performance characteristics such as strength, heat conduction, and/or to minimize weight.

A PCBA 335 may be secured to cap 330 within opening 322 by one or more bolts, bonds, buckles, catches, clasps, clips, fasteners, hooks, knobs, latches, links, pegs, pins, snaps, or any other connections, or by any combination thereof. For example, PCBA 335 may be secured to cap 330 with one or more bolts 339. PCBA 335 may include one or more LEDs (e.g., LEDs 371, 376) electrically connected thereto, and may include control circuitry for controlling power supplied to the one or more LEDs. PCBA 335 and/or the one or more LEDs may produce heat as a byproduct during operation.

Cap 330 may include a body 331, which may be capable of receiving one or more fasteners (e.g., bolts 339, 348), and may serve to conduct heat away from PCBA 335 and/or the one or more LEDs. Further, cap 330 may include one or more fins 332, which may conduct heat away from body 331, and may dissipate heat into the environment exterior to lighting module 320. A mounting apparatus 360 may be mounted to body 331, and may enable lighting module 320 to be secured to bar 305.

A reflector 340 may be located within opening 322 for redistributing light from the one or more LEDs (e.g., LEDs 371, 376). Reflector 340 may be secured to housing 321 and/or cap 330 by bolts 348. For example, reflector 340 may have one or more wedges 347 extending from an outer surface 346 to engage with bolts 348. Wedges 347 may be received into one or more seats 325 of housing 321. Thus, in this example, each bolt 343 may extend through a wedge 347, a seat 325, and into body 331 of cap 330.

Figure 4:
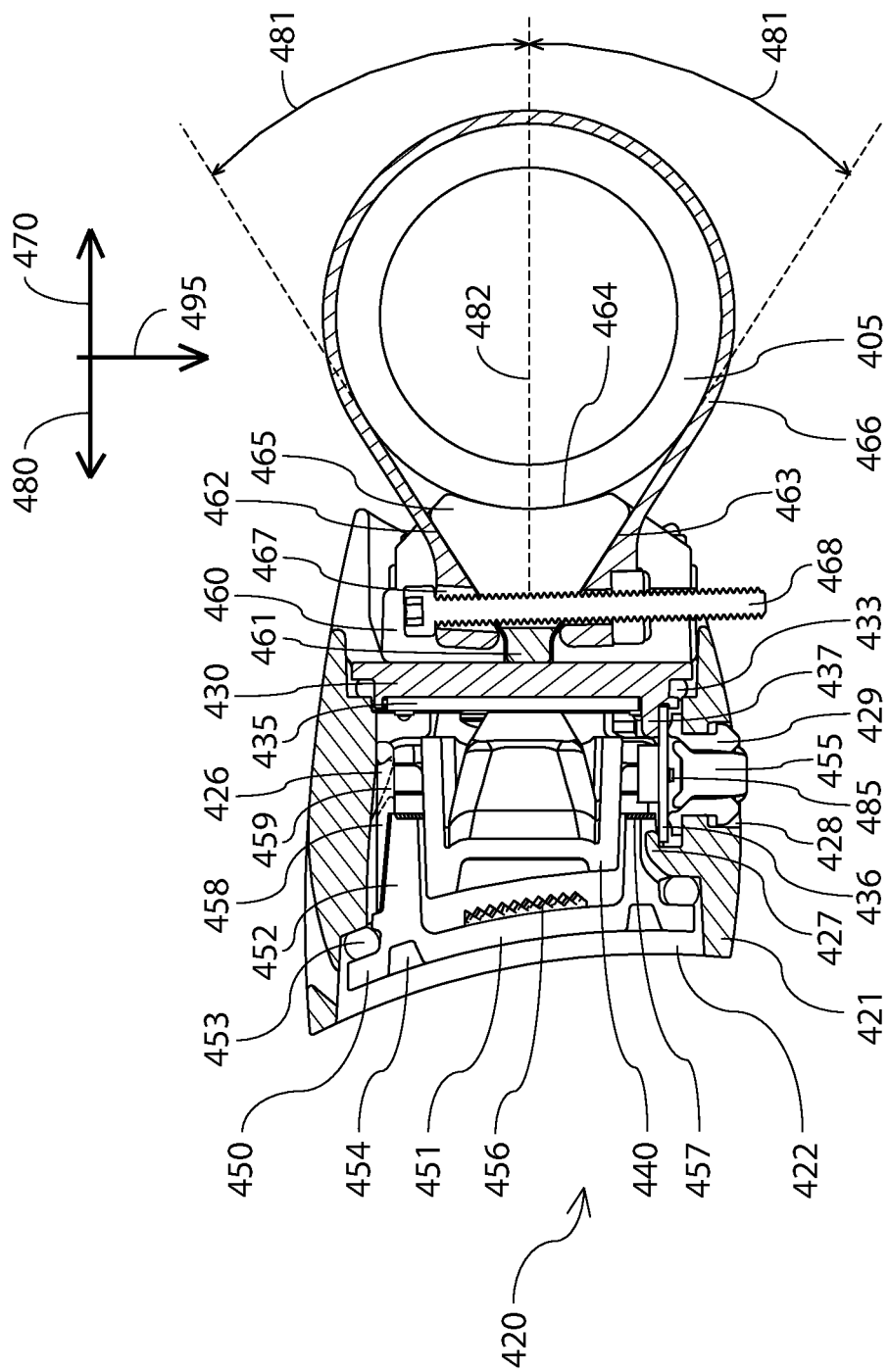
FIG. 4 illustrates a cross-section of the lighting module of FIG. 1.

Housing 321 may include one or more prongs 326 extending within opening 322, which may enable attachment of a rearward covering (e.g., media 450 of FIG. 4) to seal a rearward portion of opening 322 and prevent entrance of moisture and/or other contaminants (e.g., as further described with respect to prongs 426 of FIG. 4).

FIG. 4 illustrates a cross-section of a lighting module 420. In general, a forward direction is indicated by arrow 470 and a rearward direction is indicated by arrow 480. While the present embodiment may be described as a rearward facing lighting module or a lighting module emitting light in rearward direction 480, a person of ordinary skill in the art will appreciate that the present invention may be oriented to emit light in any direction.

Lighting module 420 may include a housing 421 with an opening 422 extending therethrough for containing components of the lighting module 420. A cap 430 may enclose and/or seal a forward portion of opening 422 (e.g., via gasket 433). A mounting apparatus 460 may be secured to cap 430 to enable mounting of lighting module 420 to bar 405. Mounting apparatus 460 may be formed of metal (e.g., aluminum), plastic (e.g., Lexan resin), composite material (e.g., glass-filled nylon), and/or any combination thereof. Mounting apparatus 460 may include a mounting bracket 461 secured to cap 430 and a mounting arm 466 for engagement with bar 405. Mounting bracket 461 may be secured to cap 430 and/or housing 421 by one or more fasteners (e.g., via bolts 569 of FIG. 5). Mounting bracket 461 may include surfaces for attachment of mounting arm 466 and bar 405 (e.g., surfaces 462-464).

Mounting arm 466 may extend at least partially around bar 405 to secure lighting module 420 to bar 405. For example, mounting arm 466 may extend around more than half a circumference of bar 405. In another example, arm 466 may extend from a first surface 462 of mounting bracket 461 and may extend around a substantial portion of the circumference of bar 405 to a second surface 463 of mounting bracket 461. Mounting arm 466 may be secured to first and second surfaces 462, 463 by one or more bolts, bonds, buckles, catches, clasps, clips, fasteners, hooks, knobs, latches, links, pegs, pins, snaps, or any other connections, or by any combination thereof. For example, mounting arm 466 may be secured to first and second surfaces 462, 463 by one or more bolts 468 extending through one or more apertures 467 in each end of mounting arm 466.

First and second surfaces 462, 463 may be parallel or non-parallel to facilitate attachment of mounting arm 466 around bar 405. For example, first surface 462 may be at an angle with respect to second surface 463. In another example, the angle may be between about 10 degrees and about 140 degrees (e.g., about 66 degrees). In another example, first and second surfaces 462, 463 may each be offset by an angular offset 481 from a horizontal plane 482 extending through a center of mounting bracket 461. For example, angular offset 481 may be between about 10 degrees and about 60 degrees (e.g., about 33 degrees). In another example, angular offset 481 may be between about 5 degrees and about 70 degrees (e.g., about 33 degrees). In another example, first and second surfaces 462, 463 may converge from a forward position to a rearward position along mounting bracket 461 to enable variable positioning of mounting arm 466.

Mounting bracket 461 may have one or more slots 465 extending therethrough for receiving bolts 468. For example, slots 465 may extend from a forward portion of bracket 461 to a depth less than the depth of bracket 461. In another example, slots 465 may extend through an interior of bracket 461 (e.g., between a forward and a rearward portion of bracket 461).

Mounting arm 466 may be capable of sliding forwardly and/or rearwardly along first and second surfaces 462, 463, and bolts 468 may be capable of moving forwardly and/or rearwardly through slots 465, to accommodate different sized bars 405. For example, as bolt 468 is tightened, mounting arm 466 may slide rearwardly across first and second surfaces 462, 463, and bolt 468 may slide rearwardly through slot 465, to secure lighting module 420 to bar 405. In another example, as bolt 468 is loosened, mounting arm 466 may be capable of sliding forwardly across first and second surfaces 462, 463, and bolt 468 may be capable of sliding forwardly through slot 465, to unsecure lighting module 420 from bar 405. In another example, tightening of bolt 468 may cause bar 405 to be held securely against a forward surface of mounting bracket 461 (e.g., against a third surface 464).

Bolt 468 may exhibit a range of motion within slot 465 to enable securement of lighting module 420 to different sized bars 405. For example, bolt 468 may be tightened to a first tightness corresponding to a forward position in slot 465. In this position, mounting arm 466 may be capable of extending around and enabling securement to a bar 405 having a first diameter (e.g., 2 inches). In another example, bolt 468 may be tightened to a second tightness corresponding to a rearward position in slot 465. In this position, mounting arm 466 may be capable of extending around and enabling securement to a bar 405 having a second diameter (e.g., 1.75 inches). The first diameter may be larger than the second diameter.

In another example, bolt 468 may be tightened a distance between about 0.1 and about 0.7 inches between the first tightness and the second tightness (e.g., about 0.4 inches). In another example, bolt 463 may be capable of being tightened in a range corresponding to securement with bars having a diameter of between about 1.5 inches and about 2.5 inches. In another example, bolt 468 may be capable of sliding between about 0.1 inches and about 0.7 inches within slot 465 (e.g., about 0.33 inches). In another example, the ratio of the sliding motion of bolt 468 to the tightening motion of bolt 468 may be between about 1:2 and about 2:1 (e.g., about 4:5). A person of ordinary skill in the art will appreciate that various dimensions may be possible beyond the examples given.

Lighting module 420 may be installed onto a bar 405 in the following manner: First, arm 466 may be extended around bar 405. Second, the one or more fasteners 468 may be extended through the one or more apertures 467 in arm 466. Third, lighting module 420 with pre-mounted bracket 461 may be connected to arm 466 by passing first and second surfaces 462, 463 between opposing ends of arm 466, and by weaving fasteners 468 into the one or more slots 465. Fourth, tightening fasteners 468 until arm 466 is held securely against first and second surfaces 462, 463, and/or until bar 405 is held securely against third surface 464. A person of ordinary skill in the art will appreciate that alternative orders for attachment may exist.

In an alternative embodiment, mounting bracket 461 may facilitate in attachment of lighting module 420 to a structure other than a bar. For example, mounting bracket 461 may closely resemble an "L" bracket having a first surface capable of attachment to cap 430 and a second surface capable of attachment to the structure. Attachment may be facilitated by one or more bolts, bonds, buckles, catches, clasps, clips, fasteners, hooks, knobs, latches, links, pegs, pins, snaps, or any other connections, or by any combination thereof. For example, mounting bracket 461 may enable lighting module 420 to be attached to a panel, a bumper, a wheel well, a door, a window, or any other number of brackets, vehicle elements, and static structure elements, such as attachment to a bracket which also carries a spare wheel for the intended vehicle.

A PCBA 435 with one or more LEDs (e.g., LEDs 270-234 of FIG. 2) may be secured to cap 430 within opening 422 to emit light in a first direction (e.g., in direction 480). A reflector 440 may be placed within opening 422 for redistributing light from the one or more LEDs. Reflector 440 may be formed of a material having a high reflectivity, or may be formed of some other material with a high reflectivity coating applied.

A rearward portion of opening 422 may be enclosed by a rearward covering (e.g., via media 450) to seal the rearward portion of opening 422 and prevent entrance of moisture and/or other contaminants. Media 450 may have a face portion 451 extending substantially across opening 422. Face portion 451 may be sealed to housing 421 by a gasket 453 interposed therebetween. Media 450 may have a perimeter portion 452 extending substantially perpendicularly to face portion 451, such that perimeter portion 452 may extend into opening 422 between reflector 440 and housing 421.

Face portion 451 may be smooth, or may have surface characteristics (e.g., 454, 456) to subtend light (e.g., collimate, focus, and/or diffuse light) transmitted therethrough. Further, the surface characteristics may be on an interior surface of face portion 451 and/or on an exterior surface of face portion 451. For example, surface characteristics 454, 456 may include any one or more of beads, bumps, concavities, convexities, corner cube geometries, channels (e.g., "v" cut channels), depressions, dimples, dips, hollows, impressions, indentations, notches, scoops, troughs, or any combination thereof. For example, surface characteristics 454, including a trough, may extend around a perimeter of the exterior surface of face portion 451. In another example, surface characteristics 456, including corner cube geometry, may extend across a portion of the interior surface of face portion 451 (e.g., in discrete zones and/or lettering).

Thus, light emitted by one or more LEDs may pass directly to, or may be reflected by, reflector 440 to face portion 451. For example, the emitted light may be transmitted through surface characteristics 456, then may be transmitted through face portion 451, and may pass to an exterior of lighting module 420. In another example, the emitted light may be transmitted through face portion 451, then may be transmitted through surface characteristics 454, and may pass to an exterior of lighting module 420. In another example, the emitted light may be transmitted through surface characteristics 456, then may be transmitted through face portion 451, then may be transmitted through surface characteristics 454, and may pass to an exterior of lighting module 420.

Perimeter portion 452 may extend around a perimeter of the interior surface of face portion 451, such that reflector 440 extends into perimeter portion 452 and/or perimeter portion 452 extends around an outer surface of reflector 440 (e.g., surface 346 of FIG. 3). Further, perimeter portion 452 may be smooth, or may have surface characteristics (e.g., surface characteristics 457) to subtend light (e.g., collimate, focus, and/or diffuse light) transmitted therethrough. For example, surface characteristics 457 may include any one or more of beads, bumps, concavities, convexities, corner cube geometries, channels (e.g., "v" cut channels), depressions, dimples, dips, hollows, impressions, indentations, notches, scoops, troughs, or any combination thereof. For example, surface characteristics 457, including "v" cut channels, which may extend around perimeter portion 452 on a forward surface thereof.

Thus, light emitted by one or more LEDs may pass directly to, or may be reflected by reflector 440 to perimeter portion 452. For example, the emitted light may be transmitted through surface characteristics 457, then may be transmitted through perimeter portion 452, then may be transmitted through face portion 451, and may pass to an exterior of lighting module 420. In another example, the emitted light may be transmitted through surface characteristics 457, then may be transmitted through perimeter portion 452, then may be transmitted through face portion 451, then may be transmitted through surface characteristics 454, and may pass to an exterior of lighting module 420. Thus, the perimeter portion 452 of media 450 may operate as a light pipe and media 450 may transmit light emitted by one or more LEDs from inside opening 422 to an exterior of lighting module 420.

In addition to causing the collimation, focusing, and/or diffusion of light emitted by one or more LEDs, the surface characteristics (e.g., 454, 456, 457) may enable the reflection of light from exterior to lighting module 420 (e.g., light emitted by another vehicle, or ambient light). For example, light emitted by an external light source toward surface characteristics 454, 456, 457, may appear to cause one or more of a gleaming, glistening, glowing, mirroring, reflecting, refracting, shimmering, shining, and/or sparkling effect, or any combination thereof.

Moreover, the reflected light may be directed via the light-pipe properties of perimeter portion 452 to specific regions of media 450. For example, a halo effect may be created when external light incident upon the surface characteristics (e.g., 454, 456, 457) may be redirected by the light-pipe properties of perimeter portion 452 such that the reflected light may be seen by an observer as highlighting a perimeter region of media 450 (e.g., providing a halo of light around the perimeter of media 450). In addition, other features (e.g., branding features) may be embedded within central portions of media 450 and caused to reflect light indicative of the other features (e.g., appear as if the other features glow) when external light incident upon the surface characteristics (e.g., 454, 456, 457) is directed via the light-pipe properties of perimeter portion 452 to such other features.

In an alternative embodiment, perimeter portion 452 may be formed separately from face portion 451, and may nestle together during installation. Abutting surfaces of face portion 451 and perimeter portion 452 may be smooth and/or may include surface characteristics as herein described. The inclusion of surface characteristics between face portion 451 and perimeter portion 452 may serve to further subtend light (e.g., collimate, focus, and/or diffuse light) transmitted therethrough.

Media 450 may be secured to housing 421 and/or cap 430 by one or more bolts, bonds, buckles, catches, clasps, clips, fasteners, hooks, knobs, latches, links, pegs, pins, snaps, or any other connections, or by any combination thereof. For example, media 450 may be snap fitted to housing 421 within opening 422, where perimeter portion 452 may have one or more tabs 458 extending forwardly for mating engagement with one or more prongs 426 of housing 421. In an alternative embodiment, tabs 458 may extend forwardly from face portion 451, adjacent to perimeter portion 452 for mating engagement with one or more prongs 426 of housing 421.

The tabs (e.g., tabs 458) of either embodiment may be flexible and/or compliant. In another example, media 450 may be inserted into opening 422 until tabs 458 matingly engage with prongs 426. In another example, insertion of media 450 into opening 422 may cause tabs 458 to deflect over prongs 426 until each prong 426 is able to matingly engage with each tab 458. Further, the engagement may be provided for by an opening 459 in a forward end of tabs 458, such that tabs 458 snap over, onto, and/or around prongs 426 or prongs 426 are inserted into openings 459. Media 450 may be held securely against housing 421 by the engagement of tabs 458 and prongs 426 (e.g., with gasket 453 interposed between media 450 and housing 421).

Media 450 may be transparent, translucent, opaque, and/or may have regions of transparency, translucence, or opaqueness. Further, media 450 may have colored regions (e.g., red, blue, amber, or white). For example, face portion 451 may be transparent. In another example, perimeter portion 452 may be translucent. In another example, face portion 451 may be clear. In another example, perimeter portion 452 may be red (e.g., where it is desirable for light emitted by a particular functional group of LEDs to appear red to those viewing the lighting module 420). While face portion 451 and perimeter portion 452 have been identified as discrete regions to which color and/or transparency may be applied, a person of ordinary skill in the art will appreciate that a media 450 may be segmented into various regions to optimize lighting or signaling effect.

Housing 421 may have a second opening 426 substantially perpendicular to opening 422 (e.g., in a bottom side wall of housing 421). Opening 428 may be substantially smaller than opening 422. A second media 455 may be positioned in a covering relationship with opening 423. For example, media 455 may seal opening 428 (e.g., via a gasket 429). In another example, gasket 429 may both seal media 455 to housing 421, and secure media 455 in place. Media 455 may be appropriately shaped so as to be held in place by gasket 429.

A second PCBA 436 with one or more LEDs (e.g., LEDs 485) may be secured to one or more of PCBA 435, cap 430, and/or housing 421 to enable emission of light in a second direction (e.g., in downward direction 495). For example, PCBA 436 may be electrically connected to PCBA 435. In another example, PCBA 436 may be at least partially secured by one or more hooks 427 in housing 421. In another example, PCBA 436 may be at least partially secured by gasket 429. In another example, PCBA 436 may be at least partially secured by one or more tabs 437 in cap 430. In another example, PCBA 436 may be secured by hook 427, gasket 428, and tab 437 collectively.

PCBA 436 may be oriented substantially perpendicularly to PCBA 435, such that LEDs 485 emit light substantially perpendicularly to light emitted by LEDs corresponding to PCBA 435 (e.g., LEDs 270-284, of FIG. 2). Further, light emitted by LEDs 485 may pass through media 455 to the exterior of lighting module 420. For example, where LEDs corresponding to PCB 435 emit light substantially in direction 480, LEDs 485 may emit light substantially in direction 495 (e.g., onto the ground and/or into a seating/storage space in the vehicle). In another example, an operator of the vehicle may be capable of selecting one or more modes of operation of lighting module 420 corresponding to emission of light by LEDs 485, and/or selecting one or more modes of operation of LEDs 485 simultaneously with one or more modes of operation associated with other LEDs (e.g., LEDs 270-284 of FIG. 2).

Figure 5:
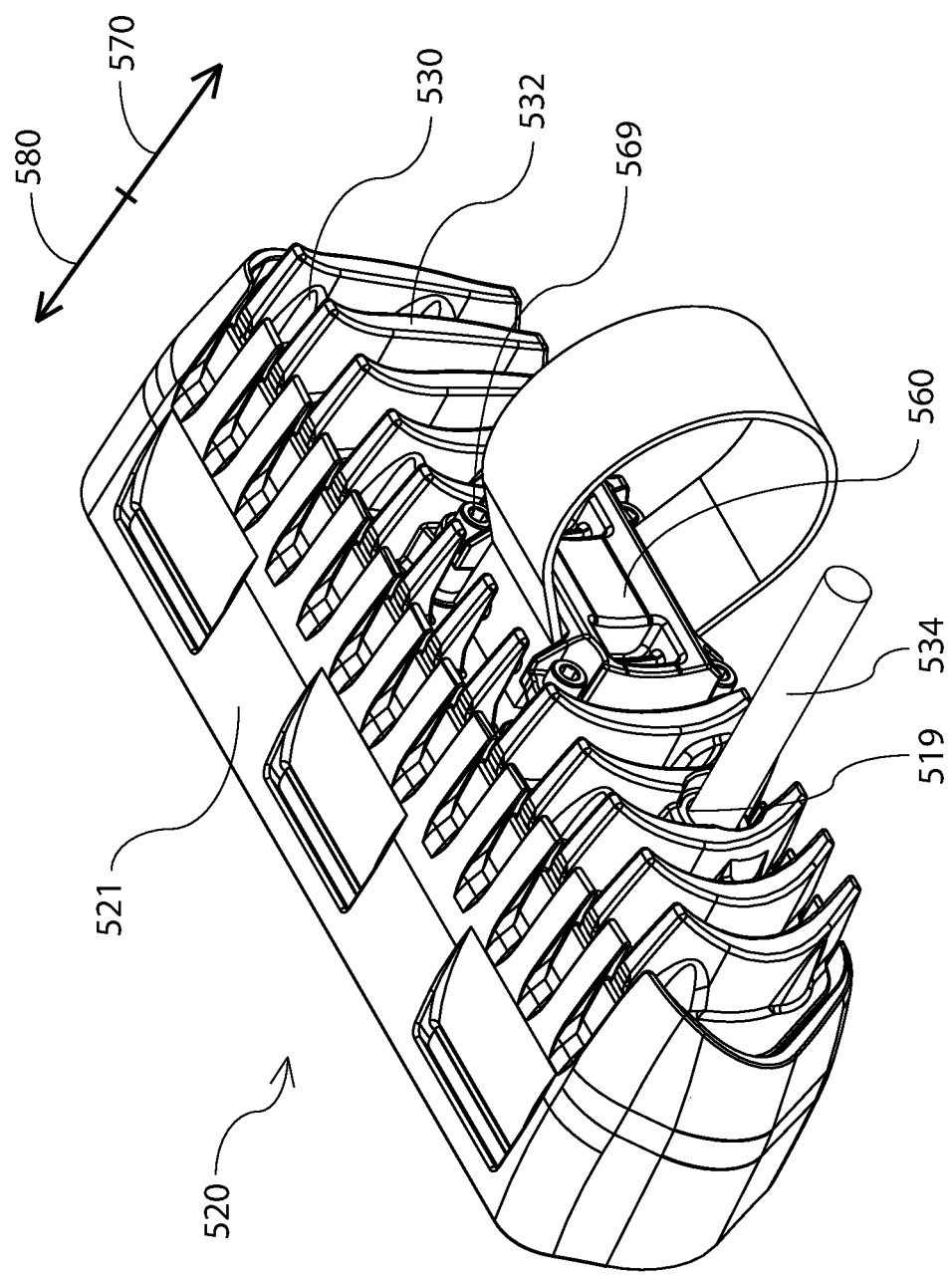
FIG. 5 illustrates an isometric view of a lighting module according to an embodiment of the present invention.

FIG. 5 illustrates an isometric view of a lighting module 520. In general, a forward direction is indicated by arrow 570 and a rearward direction is indicated by arrow 530. While the present embodiment may be described as a rearward facing lighting module or a lighting module emitting light in rearward direction 580, a person of ordinary skill in the art will appreciate that the present invention could be oriented to emit light in any direction.

Lighting module 520 may include a hollow housing 521 enclosed and/or sealed by cap 530 at a forward end thereof. A mounting apparatus 560 may be mounted to cap 530, and may enable lighting module 520 to be secured to a bar (e.g., bar 105 of FIG. 1). Mounting apparatus 560 may be secured to cap 530 and/or housing 521 by one or more bolts, bonds, buckles, catches, clasps, clips, fasteners, hooks, knobs, latches, links, pegs, pins, snaps, or any other connections, or by any combination thereof. For example, mounting apparatus 560 may be mounted to cap 530 and/or housing 521 by one or more bolts 569.

The lighting module 520 may receive power from a cable 534 connected at one end to a PCBA (not shown) within housing 521. Cable 534 may extend through an aperture (not shown) in housing 521 and/or through an aperture 519 in cap 530 to an exterior of lighting module 520. For example, cable 534 may extend through cap 530 from a forward side of lighting module 520 (as illustrated in FIG. 5). In another example, cable 534 may be sealed within aperture 519 by a gasket (not shown). Cable 534 may be connected to an opposite end to a source of electrical power (e.g., a battery of an off-road vehicle, such as battery 602 of FIG. 6).

Cap 530 may have one or more fins 532 extending forwardly from lighting module 520 to enable dissipation of heat generated within housing 521 (e.g., as described with reference to fins 332 of FIG. 3). Further, fins 532 may have a curved forward profile, such that fins 532 extend forwardly without interfering with securement of lighting module 520 to a bar (e.g., bar 405 of FIG. 4).

Figure 6:
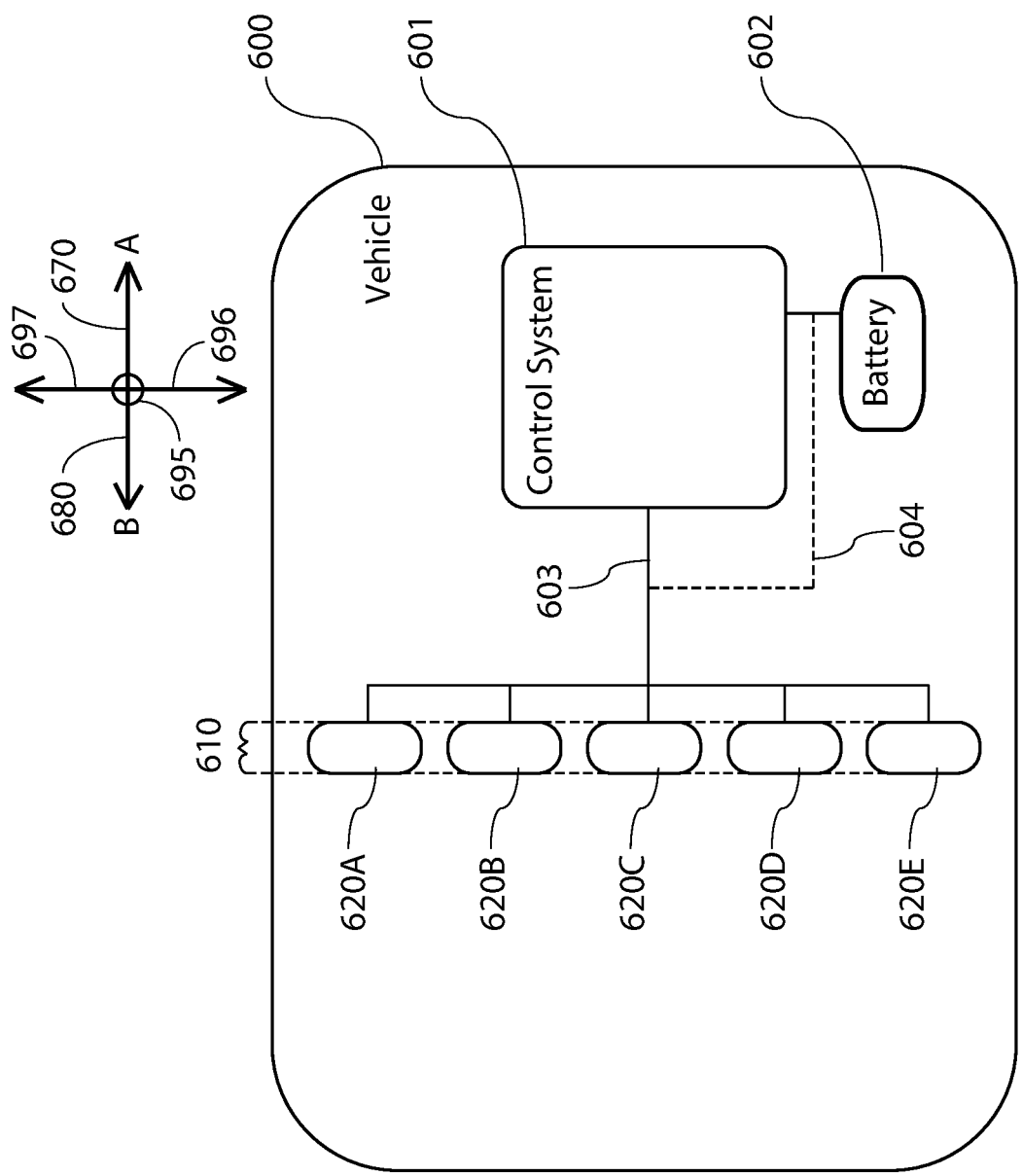
FIG. 6 illustrates a block diagram of a lighting system having one or more lighting modules integrated in a vehicle according to an embodiment of the present invention.

FIG. 6 illustrates a block diagram of a lighting system 610 having one or more lighting modules (e.g., lighting modules 620A-620E) integrated in a vehicle 600. In general, a forward direction of vehicle 600 is indicated by arrow 670, and a rearward direction is indicated by arrow 630. While the present embodiment may be described as a rearward facing lighting module or a lighting module emitting light in rearward direction 680 a person of ordinary skill in the art will appreciate that the present invention could be oriented to emit light in any direction (e.g., such as into the plane of the paper depicted as downward direction 695 or in sideward directions 696 and 697). Vehicle 600 may be any one or more of an off-road vehicle, a privately owned vehicle, a commercially owned vehicle, a racing vehicle, an industrial vehicle, a farming vehicle, or any other vehicle driven in twilight, dusk, night-time, low-visibility, and/or adverse weather conditions.

Vehicle 600 may have a control system 601 that may provide a manually controlled lighting system (e.g., a dashboard with switches, buttons, and/or other controls) for use by an operator of vehicle 600 during operation of vehicle systems to provide direct control of the emission of light from lighting system 610 and an automatically controlled lighting system (e.g., brake signals, reverse direction signals and turn indicators) that may be activated automatically by vehicle 600 in response to indirect operator input during operation (e.g., the operator may apply the brakes, place the transmission into reverse or signal a turn). A power source (e.g., a battery 602) may provide power to control system 601 to power the vehicle systems, and may provide power to lighting modules 620A-620E via control system 601. The lighting system 610 may be integrated with the control system 601 of vehicle 600, such that the lighting system 610 may be controlled by control system 601. For example, lighting system 610 may include a single lighting module (e.g., lighting module 120 of FIG. 1). In another example, lighting system 610 may include two or more lighting modules. In another example, lighting system 610 may include five lighting modules 620A, 620B, 620C, 620D, and 620E.

Each lighting module 620A-620E may be independently mounted to a structural element of vehicle 600 (e.g., to bar 405 via mounting apparatus 460 of FIG. 4). The lighting modules 620A-620E may each be mounted uniformly so that light may be emitted from vehicle 600 in first and second directions (e.g., in rearward direction 680 and downward direction 695). Alternatively, lighting modules 620A-620E may be mounted non-uniformly so that light from one or more lighting modules may be emitted from vehicle 600 in first and second directions (e.g., in rearward direction 680 and downward direction 695), while light from one or more other lighting modules may be emitted from vehicle 600 in second and third directions (e.g., in downward direction 695 and to a side of vehicle 600 in directions 696 and/or 697).

Each of lighting modules 620A-620E may be independently and/or collectively connected to control system 601 (e.g., via path 603) for operation thereby. Although path 603 is illustrated as a single set of wires extending to control system 601, a person of ordinary skill in the art will appreciate that path 603 may be duplicated and/or modified in order to enable control system 601 to individually and/or collectively control each of lighting modules 620A-620E. Furthermore, power from battery 602 may be provided to lighting modules 620A-620E directly via path 604 and/or indirectly through control system 601 (e.g., via path 603).

Each of lighting modules 620A-620E may have one or more LEDs (e.g., LEDs 270-284 of FIG. 2), and LEDs may be grouped into one or more operational groups, such that each lighting module may have one or more operational groups of LEDs. For example, each lighting module 620A-620E may have the same and/or different numbers of operational groups of LEDs. In another example, each lighting modules 620A-620E may have three operational groups.

To increase versatility of lighting system 610, each operational group of LEDs of each lighting module may be independently and/or collectively operable by control system 601 at one or more power levels and/or in one or more modes of operation. For example, each operational group may operate simultaneously at one power level in one mode of operation. In another example, each operational group may operate simultaneously at different power levels in another mode of operation. In another example, each operational group may operate independently at one or more power levels, the operation of each operational group corresponding to a different mode of operation of lighting system 610. In another example, one or more operational groups may be capable of operating at an intermittent power level in one mode of operation (e.g., a strobing feature). In another example, a first operational group may operate interdependently with a second operational group, such that operation of the first operational group may cause a change in the operation of the second operational group. In another example, a first operational group from each of lighting modules 620A-620E may operate collectively, a second operational group from each of lighting modules 620A-620E may operate collectively, and a third operational group from each of lighting modules 620A-620E may operate collectively. In another example, the control circuitry in each lighting module may include a microcontroller which enables light emitted from each lighting module to be altered in duration, frequency, power level, luminance, and/or color. In another example, each microcontroller may enable two or more lighting modules to be synced (e.g., such that a strobing feature of each lighting module operates on the same frequency and duration). For example, path 603 may include wires connected at a common hub to control system 601, such that when control system 601 is not sending signals and/or power to lighting modules 620A-620E, lighting modules 620A-620E may communication with each other (e.g., via electrical signals). In another example, lighting modules 620A-620E may communicate wirelessly (e.g., via radio frequency, Bluetooth, or by any other wireless means). A person of ordinary skill in the art will appreciate that a plurality of operating modes may be possible to incorporate various operating conditions, duration, frequency, color and power levels for each operational group in each lighting module of lighting system 610.

Each lighting module 620A-620E may have one or more colors associated with each operational group to enable various signaling options corresponding to vehicle operating conditions. For example, lighting modules 620A and 620E may have a first operational group of LEDs which emit white light (e.g., LEDs 270, 271 of FIG. 2), may have a second operational group of LEDs which emit red light (e.g., LEDs 272-284 of FIG. 2), and/or may have a third operational group of LEDs which emit white light (e.g., LEDs 485 of FIG. 4). In another example, lighting modules 620B and 620D may have similar operational groups to lighting modules 620A and 620E, except that the second operational group of LEDs may emit amber light. In another example, lighting module 620C may have similar operational groups to the other modules, except that the second operational group of LEDs may emit blue light.

In the above examples, the second operational groups of modules 620A, 620B, 620D, and 620E may be operated independently and/or collectively, such that red and/or amber light may be emitted at a first power level (e.g., corresponding to running lights of vehicle 600). Further, the second operational group of module 620C may be operated independently and/or collectively with the second operational groups of the other modules, such that blue light may be emitted at the first power level (e.g., if the operator of vehicle 600 desires to signal to other vehicles that vehicle 600 is moving slowly). Further, each of the second operational groups may be capable of being operated at an intermittent power level (e.g., strobing to simulate hazard lights).

Each of the second operational groups of modules 620A-620E may be operated independently, interdependently and/or collectively, such that red, amber, and/or blue light may be emitted at a second power level (e.g., corresponding to brake lights of vehicle 600). Thus, if red, amber, and/or blue running lights are active when the operator steps on the brake pedal, each active lighting module will be stepped up to the second power level. The second power level may be greater than the first power level.

In the above examples, the first operational groups of each of lighting modules 620A-620E may be operated independently and/or collectively, such that white light may be emitted at a third power level (e.g., corresponding to a reverse driving condition of vehicle 600). The third power level may be the same as, greater than, or less than the second power level. Thus, if the operator puts the vehicle transmission (not shown) in a reverse driving condition, red, amber, and/or blue light may be disengaged, and white light may be emitted from the first operational groups of LEDs, such that the activation of the first operational group of LEDs (e.g., white lights) override the operation of the second operational group (e.g., the red, amber, and/or blue lights). In the present example, the operator may be able to see clearly while operating vehicle 600 in the reverse driving condition. Further, other vehicles in the area may be able to clearly see that vehicle 600 may be moving in a rearward direction 680.

In the above examples, the third operational groups of each of lighting modules 620A-620E may be operated, such that white light may be emitted at a fourth power level (e.g., corresponding to scene lighting within and/or immediately around vehicle 600). The fourth power level may be the same as, greater than, or less than the second and/or the third power levels. Furthermore, the third operational groups of each lighting module may be operable independently and/or collectively with the first and second operational groups. Thus, an operator may be able to activate the third operational groups (e.g., cabin lights) despite any other mode of operation of lighting system 610.

While the above example was described in terms of five lighting modules, each having three operational groups of LEDs, a person of ordinary skill in the art will appreciate that more or less lighting modules and more or less operational groups may be possible to produce lighting systems with the desired level of lighting versatility and function. For example, a lighting system may include one, two, three, four, five, six, seven, eight, nine, ten, or more lighting modules. In another example, each lighting module may include one, two, three, four, five, six, seven, eight, nine, ten, or more operational groups of LEDs. For example, a lighting system 610 may include only a single lighting module (e.g., lighting module 120 of FIG. 1), and the lighting module may have three operational groups of LEDs. A single lighting module with three operational groups may be capable of providing several signaling options to a vehicle operator (e.g., running lights, brake lights, signal lights, hazard lights, reverse lights, and/or scene lights). Thus, even a single lighting module may have a high level of versatility and/or adaptability in operation.

Further, while the above example was described as having two white/red/white lighting modules, two white/amber/white lighting modules, and one white/blue/white lighting modules, a person of ordinary skill in the art will appreciate that more or less of each of these colors and/or the use of additional colors may be selected to produce a desired color effect and/or signaling effect. For example, an operator may desire to use LEDs emitting green, purple, black, or other light spectrums (e.g., infrared or ultraviolet).

Furthermore, while a change in power levels has been described as a way to adjust the luminance of light emitted by one or more LEDs, a person of ordinary skill in the art will appreciate that luminance may be effectively altered using other known methods. For example, analog diming, duty cycle modulation, frequency modulation, and/or pulse width modulation.

Figure 7:
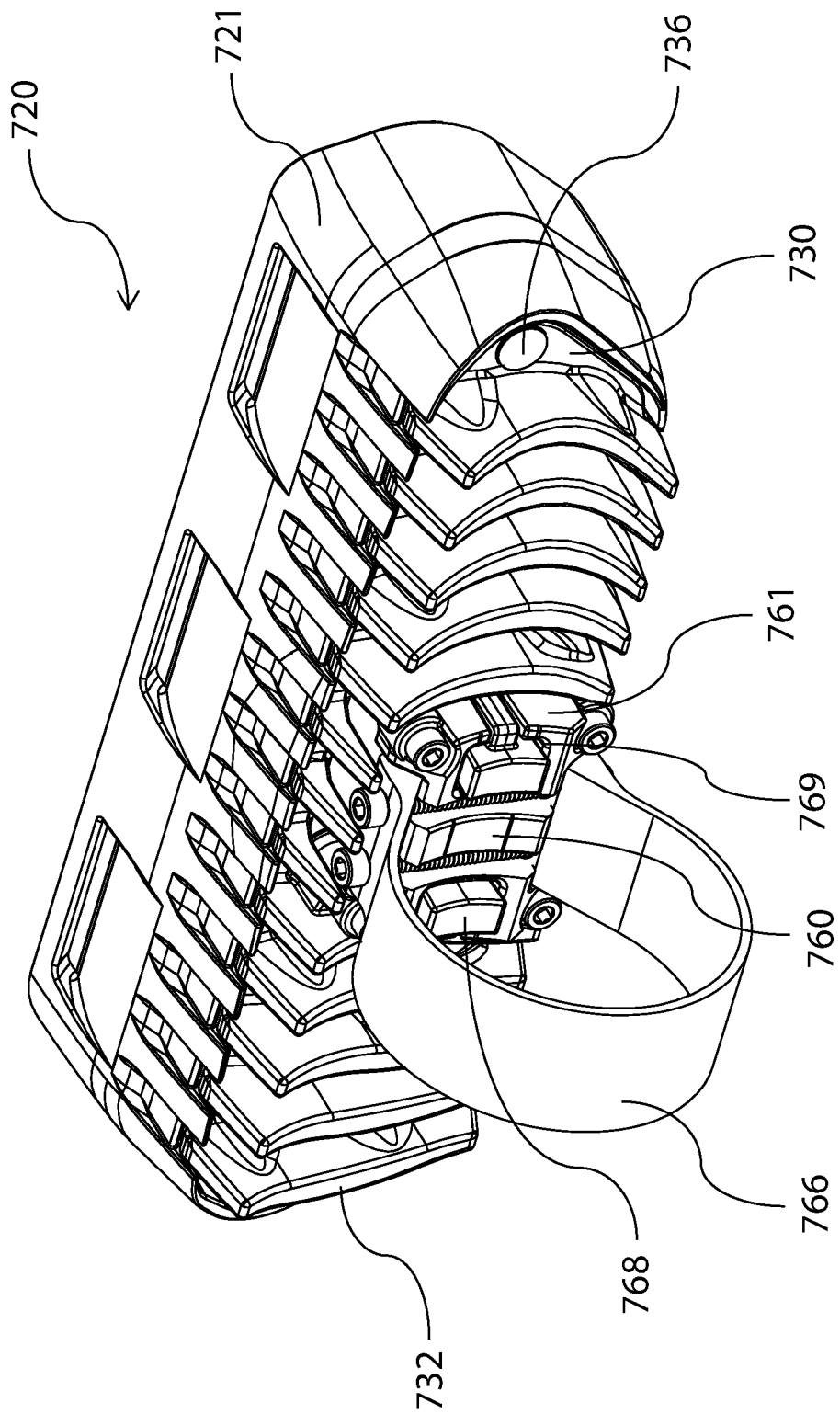
FIG. 7 illustrates an isometric view of a lighting module according to another embodiment of the present invention.

FIG. 7 illustrates an isometric view of a lighting module 720. The lighting module 720 may include a hollow housing 721 that is at least partially enclosed by a cap 730. Cap 730 may have one or more fins 732 extending therefrom to enable dissipation of heat produced within the hollow housing 721. A breather 736 may be adhered or otherwise connected to cap 730 over an orifice (not shown) extending through cap 730 to enable equalization of pressure within hollow housing 721. Accordingly, breather 736 may enable passage of air into and/or out of hollow housing 721, but may prevent other gasses, liquids, and/or solids from passing into hollow housing 721. Alternatively, breather 736 may be configured to cover an orifice (not shown) in housing 721.

A mounting apparatus 760 may be mounted to cap 730, which may enable lighting module 720 to be secured to a bar or other structural element (e.g., bar 105 of FIG. 1). The mounting apparatus 760 may include a mounting arm 766 extending at least partially around the bar, and a mounting bracket 761 which may enable tightening of mounting arm 766 into an interference fit with the bar. To prevent lighting module 720 from translating and/or rotating with respect to the bar or structural element, one or both of mounting bracket 761 and mounting arm 766 may include one or more bumpers 768. Bumpers 766 may be formed of an elastomer (e.g., rubber), plastic (e.g., Lexan resin), composite material (e.g., glass-filled nylon), and/or any combination thereof.

For example, two bumpers 768 may be configured to extend from mounting bracket 761 to contact the bar (e.g., as exemplified in FIG. 7). In another example, two bumpers 761 may extend from mounting bracket 761 with a spacing therebetween that is greater than or equal to the mounting arm 766 (e.g., extending beyond the mounting arm 766). In another example, each bumper 768 may be capable of deforming and/or compressing into a depression 769 of the mounting bracket 760, such that the bar may contact the mounting bracket 760 when the mounting arm 766 is tightened (e.g., contacting third surface 464 of FIG. 4).

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A lighting module coupled to a vehicle control system, the lighting module comprising:
    a housing with an opening therein;
    a first operational group of light sources arranged within the opening and configured to emit light in response to a first vehicle operating condition;
    a second operational group of light sources arranged within the opening and configured to emit light in response to a second vehicle operating condition; and
    a third operational group of light sources arranged within the opening and configured to emit light independently of any vehicle operating condition.

2. The lighting module of claim 1, wherein the light sources include light emitting diodes.

3. The lighting module of claim 1, wherein at least one of the operational groups of light sources is configured to emit light in a first direction, and at least one of the operational groups of light sources is configured to emit light in a second direction.

4. The lighting module of claim 1, further including a mounting apparatus coupled to the housing, the mounting apparatus including,
    a mounting bracket including a first surface and a second surface angularly offset from the first surface; and
    a mounting arm capable of extending around a structural element, the mounting arm including opposing ends configured to be coupled to the first and second surfaces, respectively, wherein opposing ends of the mounting arm are moveable with respect to the first and second surfaces to secure the structural element.

5. The lighting module of claim 1, further including a first media, the first media including,
    a face portion configured to enclose the opening; and
    a perimeter portion extending around a perimeter of the face portion, the perimeter portion having a thickness substantially greater than the face portion.

6. The lighting module of claim 5, wherein the face portion and the perimeter portion are formed separately.

7. The lighting module of claim 5, further including one or more surface characteristics configured on the first media to subtend light emitted by one or more of the operational groups of light sources; wherein the surface characteristics are selected from the group including beads, bumps, concavities, convexities, corner cube geometries, channels, depressions, dimples, dips, hollows, impressions, indentations, notches, scoops, troughs, and any combination thereof.

8. The lighting module of claim 7, wherein the first operational group of light sources emit light through one or more of the face portion and the one or more surface characteristics.

9. The lighting module of claim 7, wherein the second operational group of light sources emit light through one or more of the perimeter portion, the face portion, and the one or more surface characteristics.

10. The lighting module of claim 1, further including a controller arranged within the opening and configured to communicate with one or more of the vehicle control system and another lighting module.

11. The lighting module of claim 1, wherein the first and second vehicle operating conditions are one or more of a driving condition, a reverse driving condition, a braking condition, a turn signaling condition, a hazard signaling condition, or any combination thereof.

12. The lighting module of claim 1, further including a second media; wherein the third operational group of light sources emit light through the second media.

13. A lighting module coupled to a vehicle control system, the lighting module comprising:
    a housing with a first opening facing a first direction and a second opening facing a second direction;
    a first operational group of light sources arranged within the first opening and configured to emit light in response to a first vehicle operating condition;
    a second operational group of light sources arranged within the first opening and configured to emit light in response to a second vehicle operating condition; and
    a third operational group of light sources arranged within the second opening and configured to emit light independently of any vehicle operating condition.

14. The lighting module of claim 13, wherein the light sources include light emitting diodes.

15. The lighting module of claim 13, wherein the first and second operational groups of light sources are configured to emit light in the first direction, and the third operational group of light sources is configured to emit light in the second direction.

16. The lighting module of claim 13, wherein the first and second vehicle operating conditions are one or more of a driving condition, a reverse driving condition, a braking condition, a turn signaling condition, a hazard signaling condition, or any combination thereof.

17. A method, comprising:
    providing a lighting module in communication with a vehicle control system emitting light from a first operational group of light sources through a first opening of the lighting module in response to a first vehicle operating condition;

emitting light from a second operational group of light sources through the first opening in response to a second vehicle operating condition; and emitting light from a third operational group of light sources through a second opening of the lighting module independently of any vehicle operating condition.

18. The method of claim 17, wherein the first, second, and third operational groups of light sources are LEDs.

19. The lighting module of claim 17, wherein the first and second operational groups of light sources are configured to emit light in a first direction, and the third operational group of light sources is configured to emit light in a second direction.

20. The lighting module of claim 1, wherein the first and second operational groups of light sources are configured to emit light rearwardly, and the third operational group of light sources is configured to emit light downwardly.

* * * * *